United States Patent
Elias et al.

(12) 
(10) Patent No.: US 10,421,127 B2
(45) Date of Patent: Sep. 24, 2019

(54) METHOD FOR FORMING LANTHANIDE NANOPARTICLES

(71) Applicant: Raytheon Company, Waltham, MA (US)

(72) Inventors: William E. Elias, Manhattan Beach, CA (US); Theodore J. Conrad, Redondo Beach, CA (US); James R. Chow, San Gabriel, CA (US)

(73) Assignee: Raytheon Company, Waltham, MA (US)

( * ) Notice: Subject to any disclaimer, the term of this patent is extended or adjusted under 35 U.S.C. 154(b) by 569 days.

(21) Appl. No.: 14/542,150

(22) Filed: Nov. 14, 2014

(65) Prior Publication Data

US 2016/0059320 A1    Mar. 3, 2016

Related U.S. Application Data

(60) Provisional application No. 62/045,112, filed on Sep. 3, 2014, provisional application No. 62/060,234, filed on Oct. 6, 2014.

(51) Int. Cl.
*B22F 9/24*       (2006.01)
*B01J 19/12*      (2006.01)
(Continued)

(52) U.S. Cl.
CPC ............... *B22F 9/24* (2013.01); *B01J 19/123* (2013.01); *B22F 1/0018* (2013.01); *B33Y 10/00* (2014.12);
(Continued)

(58) Field of Classification Search
CPC ........ F28F 19/02; F28F 13/18; F28F 2245/00; F28F 2255/20; F28F 13/185; F28F 21/02;
(Continued)

(56) References Cited

U.S. PATENT DOCUMENTS

| 5,613,365 A | 3/1997 | Mastrup et al. |
| 6,093,504 A | 7/2000 | Bliesner |

(Continued)

FOREIGN PATENT DOCUMENTS

| CN | 202928220 U | 5/2013 |
| EP | 2 123 723 A1 | 11/2009 |

(Continued)

OTHER PUBLICATIONS

"Bonding in metals and semiconductors," part 5, available online at http://www.chem1.com/acad/webtext/chembond/cb10.html.*

(Continued)

*Primary Examiner* — Nicholas A Smith
*Assistant Examiner* — Colleen M Raphael

(57) ABSTRACT

A method includes exposing a non-aqueous solution to ultraviolet illumination, where the non-aqueous solution includes one or more lanthanide elements and one or more photo-initiators. The method also includes producing lanthanide nanoparticles using the non-aqueous solution. The non-aqueous solution could be formed by mixing a first non-aqueous solution including the one or more lanthanide elements and a second non-aqueous solution including the one or more photo-initiators. The non-aqueous solution could include one or more metallic salts, where each metallic salt includes at least one lanthanide element. The one or more metallic salts could include erbium chloride, and the one or more photo-initiators could include benzophenone. The non-aqueous solution could include an organic solvent, such as an alcohol.

21 Claims, 8 Drawing Sheets

(51) Int. Cl.

| | |
|---|---|
| *B22F 1/00* | (2006.01) |
| *B41J 2/01* | (2006.01) |
| *F28F 13/18* | (2006.01) |
| *F28F 21/02* | (2006.01) |
| *C09D 11/037* | (2014.01) |
| *C09D 11/322* | (2014.01) |
| *B33Y 10/00* | (2015.01) |
| *B33Y 80/00* | (2015.01) |
| *C09D 11/52* | (2014.01) |
| *F28F 19/02* | (2006.01) |
| *F28D 21/00* | (2006.01) |
| *F25B 9/14* | (2006.01) |
| *F25B 9/00* | (2006.01) |

(52) U.S. Cl.
CPC .............. *B33Y 80/00* (2014.12); *B41J 2/01* (2013.01); *C09D 11/037* (2013.01); *C09D 11/322* (2013.01); *C09D 11/52* (2013.01); *F25B 9/00* (2013.01); *F25B 9/145* (2013.01); *F28F 13/18* (2013.01); *F28F 13/185* (2013.01); *F28F 19/02* (2013.01); *F28F 21/02* (2013.01); *B22F 2202/11* (2013.01); *B22F 2999/00* (2013.01); *F25B 2309/1412* (2013.01); *F25B 2309/1415* (2013.01); *F28D 2021/0033* (2013.01); *F28F 2245/00* (2013.01); *F28F 2255/20* (2013.01)

(58) Field of Classification Search
CPC ..... C09D 11/52; C09D 11/037; C09D 11/322; F28D 2021/0033; B22F 9/24; B22F 1/0018; B22F 2202/11; B22F 2999/00; B01J 19/123; B41J 2/01; F25B 2309/1415; F25B 9/00; F25B 9/145; F25B 2309/1412; B33Y 80/00; B33Y 10/00
USPC .......................................... 204/157.4–157.52
See application file for complete search history.

(56) References Cited

U.S. PATENT DOCUMENTS

| | | | | |
|---|---|---|---|---|
| 7,759,935 | B2 | 9/2010 | Chretien et al. | |
| 8,101,730 | B2 | 1/2012 | Kuboshima | |
| 8,118,905 | B2 * | 2/2012 | Enomura | B01D 9/0054 422/209 |
| 8,282,860 | B2 * | 10/2012 | Chung | B22F 9/24 429/338 |
| 2003/0032192 | A1 * | 2/2003 | Haubold | C09D 11/03 423/311 |
| 2004/0000149 | A1 | 1/2004 | Kirkconnell et al. | |
| 2004/0213899 | A1 * | 10/2004 | Wang | B01J 19/123 422/186 |
| 2005/0064604 | A1 * | 3/2005 | Bohmann | B82Y 30/00 436/525 |
| 2006/0210636 | A1 * | 9/2006 | Nonninger | B22F 9/24 427/2.14 |
| 2007/0207335 | A1 * | 9/2007 | Karandikar | H01B 1/02 977/900 |
| 2011/0048171 | A1 * | 3/2011 | Enright | B22F 1/0018 75/345 |
| 2011/0186270 | A1 | 8/2011 | Chou | |
| 2015/0165056 | A1 * | 6/2015 | Omary | B22F 1/0018 435/29 |
| 2015/0225549 | A1 * | 8/2015 | Kim | B22F 9/06 524/113 |

FOREIGN PATENT DOCUMENTS

| | | |
|---|---|---|
| JP | H10-185339 A | 7/1998 |
| JP | 2828978 B2 | 11/1998 |
| JP | 2001-505638 A | 4/2001 |
| JP | 2009-024192 A | 2/2009 |
| JP | 2009-280812 A | 12/2009 |
| JP | 2012-082502 A | 4/2012 |
| WO | 2009041274 A1 | 1/2011 |

OTHER PUBLICATIONS

Encyclopedia Britannica, "Nanoparticle," available at https://www.britannica.com/science/nanoparticle, pp. 1-2.*
Shehata et al, ":Control of oxygen vacancies and Ce+3 concentrations in doped ceria nanoparticles via the selection of lanthanide elernent,"J. Nanopart. Res. (20112) vol. 14:1173 (Year: 2012).*
Conrad; et al. "Cryocooler Regenerator Containing One or More Carbon-Based Anisotropic Thermal Layers"; U.S. Appl. No. 14/151,408; 23 pages.
Cushing, et al.; "Recent Advances in the Liquid-Phase Syntheses of Inorganic Nanoparticles"; Chemical Review: 104, No. 9; 2004; 54 pages.
Eustis, Susie; "Gold and Silver Nanoparticles: Characterization of their Interesting Optical Properties and the Mechanism of their Photochemical Formation"; 2006; 290 pages.
Kapoor, S.; "Preparation, Characterization, and Surface Modification of Silver Particles"; Langmuir 14.5; 1998; 5 pages.
Kapoor, et al.; "Photochemical Formation of Copper Nanoparticles in poly (N-Vinylpyrrolidone)", Chemical Physics Letters; 370.1; 2003; 5 pages.
Kometani, et al.; "Laser Flash Photolysis Study of the Photochemical Formation of Colloidal Ag Nanoparticles in the Presence of Benzophenone." PCCP; 4.20; (2002); 6 pages.
Korchev, et al.; "Polymer-Initiated Photogeneration of Silver Nanoparticles in SPEEK/PVA Films: Direct Metal Photopatterning"; J. Am. Chem. Soc.; 126.1; 2004; 2 pages.
Mooney, et al.; "Nanocrystalline Co 30 Fe 70 Alloy Synthesized by Alkalide Reduction"; Journal of Materials Chemistry; 19.5; 2009; 6 pages.
Nelson, et al.; "Solution Synthesis of Gadolinium Nanoparticies"; Journal of the American Chemical Society: 124.12 ; 2002; 5 pages.
Nelson, et at.; "Dysprosium Nanoparticles Synthesized by Alkalide Reduction"; Journal of Materials Chemistry; 13.4; 2003; 4 pages.
Sato, et al.; "Sensitized Photoreduction of Silver Ions in the Presence of Acetophenone"; Journal of Photochemistry and Photobiology A: Chemistry; 127.1; 1999; 5 pages.
Nader Shehata, et al., "Reduced erbium-doped ceria nanoparticles: one nano-host applicable for simultaneous optical down- and up-conversions", Nanoscale Research Letters, May 13, 2014, 6 pages.
Notification of Transmittal of the International Search Report and the Written Opinion of the International Searching Authority, or the Declaration dated Sep. 22, 2015 in connection with International Patent Application No. PCT/US2015/039034.
Zivkovic; "Ternary Nanomaterials: Synthesis by Alkalide Reduction and Characterization"; UMI Dissertation Publishing; Jan. 31, 2010; 221 pages.
Japanese Patent Office, Notification of Reasons for Refusal in Application No. JP 2017-512042 dated Mar. 30, 2018, 17 pages.
Japanese Patent Office, Decision of Refusal in Application No. JP 2017-512042 dated Oct. 9, 2018, 12 pages.
"Notice of Reason(s) for Rejection" from Japanese Patent Office in Counterpart Application No. JP 2017-512041 dated May 29, 2018, 8 pages.

* cited by examiner

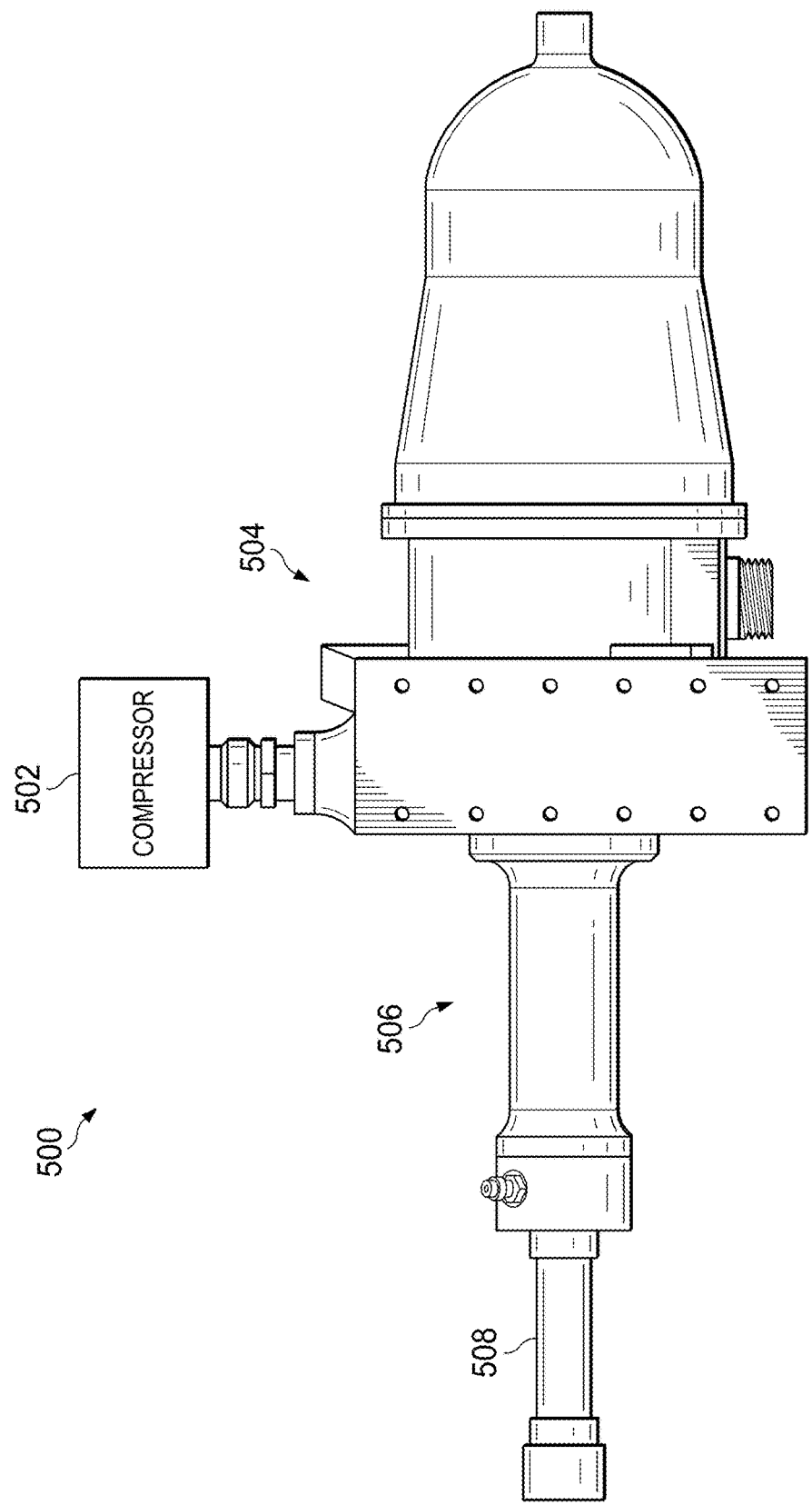

METHOD FOR FORMING LANTHANIDE NANOPARTICLES

CROSS REFERENCE TO RELATED APPLICATIONS AND PRIORITY CLAIM

This disclosure claims priority under 35 U.S.C. § 119(e) to U.S. Provisional Patent Application No. 62/045,112 filed on Sep. 3, 2014 and U.S. Provisional Patent Application No. 62/060,234 filed on Oct. 6, 2014, both of which are hereby incorporated by reference in their entirety.

TECHNICAL FIELD

This disclosure is generally directed to techniques for forming nanoparticles. More specifically, this disclosure is directed to a method for forming lanthanide nanoparticles, such as erbium (Er) or praseodymium (Pr) nanoparticles.

BACKGROUND

Inks that contain metallic nanoparticles have been developed recently for use with ink jet printers. Among other things, these inks can be used to form electronic circuit devices by printing the inks directly onto substrates in suitable patterns. As particular examples, thin film transistor (TFT) or radio frequency identification (RFID) components can be fabricated on a flexible or other substrate by printing ink containing metallic nanoparticles onto a plastic or other substrate.

These types of inks are typically formed by first manufacturing the metallic nanoparticles. The metallic nanoparticles are stabilized, and the stabilized nanoparticles are formulated into an ink. In one approach, metallic nanoparticles are manufactured using an aqueous solution containing a metal. This approach is suitable for forming metallic nanoparticles of gold, silver, copper, or other metals commonly used with electronic circuits.

SUMMARY

This disclosure provides a method for forming lanthanide nanoparticles.

In a first embodiment, a method includes exposing a non-aqueous solution to ultraviolet illumination, where the non-aqueous solution includes one or more lanthanide elements and one or more photo-initiators. The method also includes producing lanthanide nanoparticles using the non-aqueous solution.

In a second embodiment, a method includes forming a first non-aqueous solution having one or more lanthanide elements and forming a second non-aqueous solution having one or more photo-initiators. The method also includes forming a mixture of the first non-aqueous solution and the second non-aqueous solution, exposing the mixture to ultraviolet illumination, and producing lanthanide nanoparticles using the mixture.

In a third embodiment, a method includes forming a first non-aqueous solution having an organic solvent and one or more metallic salts, where each metallic salt includes at least one lanthanide element. The method also includes forming a second non-aqueous solution having an organic solvent and benzophenone. The method further includes degassing the first non-aqueous solution and the second non-aqueous solution to remove dissolved oxygen from the non-aqueous solutions. In addition, the method includes forming a mixture of the first non-aqueous solution and the second non-aqueous solution, exposing the mixture to ultraviolet illumination, and producing lanthanide nanoparticles using the mixture.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 5A and 5B illustrate a second example cryocooler having a heat exchanger that contains one or more portions created using lanthanide nanoparticles in accordance with this disclosure;

DETAILED DESCRIPTION

FIGS. 1 through 11, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
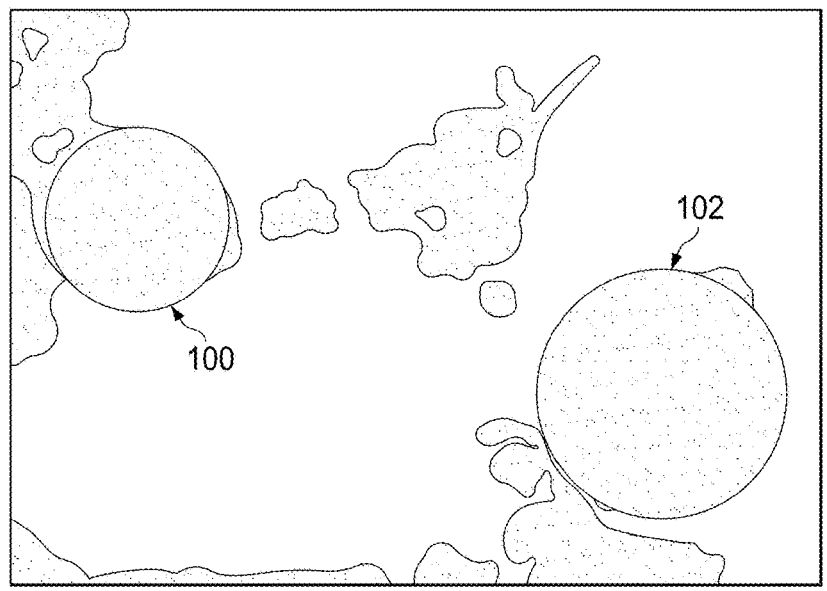
FIG. 1 illustrates example lanthanide nanoparticles according to this disclosure.

FIG. 1 illustrates example lanthanide nanoparticles 100-102 according to this disclosure. Each lanthanide nanoparticle 100-102 generally denotes a particle containing at least one lanthanide series of metal and having a sub-micron size, meaning a maximum dimension of the particle is less than 1 µm. Each lanthanide nanoparticle 100-102 can be formed from any suitable lanthanide element or lanthanide alloy. In some embodiments, the lanthanide nanoparticles 100-102 represent erbium (Er) or praseodymium (Pr) nanoparticles.

The lanthanide series of metals includes metals having very high heat capacity, which makes these metals suitable for use in applications such as cryogenic coolers (cryocoolers). For example, as described below, lanthanide nanoparticles could be formulated into an ink, which can be printed onto one or more substrates to form a heat exchanger of a cryocooler. However, lanthanide elements react with water to produce hydrogen gas and metal hydroxides. As a result, lanthanide nanoparticles typically cannot be manufactured using aqueous solutions unless adequately protected with a nearest neighbor shell.

In accordance with this disclosure, techniques are provided for manufacturing lanthanide nanoparticles. In particular, techniques are provided for manufacturing lanthanide nanoparticles using non-aqueous solutions, such as solutions containing organic solvents like one or more alcohols. The use of alcohols can significantly reduce the rate of an oxidation process, but a residual oxidative shell might still surround the lanthanide nanoparticles. These lanthanide nanoparticles can still, for example, be formulated into an ink and applied to substrates to form continuous metal traces by performing additional post-processing in a reducing atmosphere.

Figure 2:
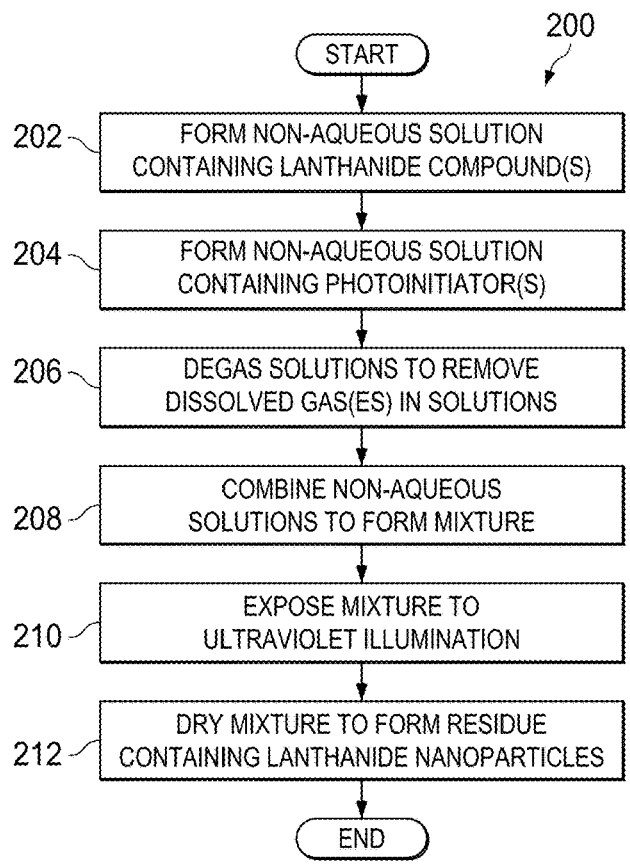
FIGS. 2 and 3 illustrate an example method for forming lanthanide nanoparticles and related details according to this disclosure.
Figure 3:
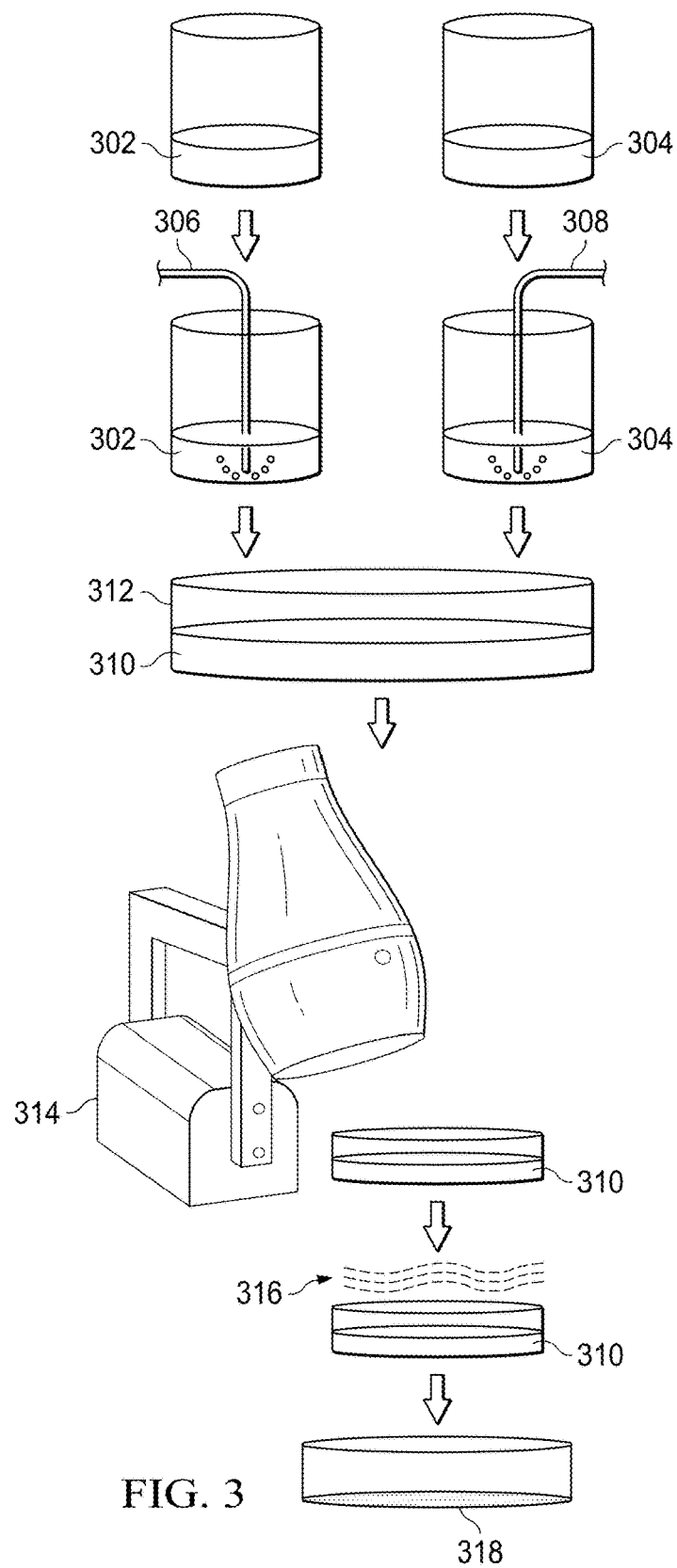

FIGS. 2 and 3 illustrate an example method for forming lanthanide nanoparticles and related details according to this disclosure. In particular, FIG. 2 contains a flowchart illustrating an example method 200 for forming lanthanide nanoparticles, and FIG. 3 illustrates various components used during the method 200 of FIG. 2.

As shown in FIGS. 2 and 3, a non-aqueous solution 302 containing one or more lanthanide compounds is formed at step 202. This could include, for example, dissolving a lanthanide metallic salt or other lanthanide compound in an organic solvent (such as an alcohol) or other non-aqueous liquid. As a particular example, the solution 302 could represent a solution containing approximately $10^{-3}$M high-purity anhydrous erbium chloride in High Performance Liquid Chromatography (HPLC)-grade isopropyl alcohol.

A non-aqueous solution 304 containing one or more photo-initiators is formed at step 204. This could include, for example, mixing benzophenone or other photo-initiator in an organic solvent (such as an alcohol) or other non-aqueous liquid. As a particular example, the solution 304 could represent a solution containing approximately $10^{-3}$M benzophenone in HPLC-grade isopropyl alcohol.

The solutions 302-304 are degassed to remove one or more dissolved gasses in the solutions at step 206. This could include, for example, bubbling dry nitrogen or other gas(es) through the solutions 302-304 to remove dissolved oxygen or other dissolved gas(es) from the solutions 302-304. In this example, gas lines 306-308 can be inserted into the solutions 302-304 in order to deliver the dry nitrogen or other gas(es) to the solutions 302-304. The degassing could occur over any suitable time period, such as a minimum of about 15 minutes (although any other suitable length or lengths of time could be used).

The non-aqueous solutions 302-304 are combined to form a mixture 310 at step 208. This could include, for example, pouring a specified amount of the non-aqueous solution 302 containing the lanthanide compound(s) and a specified amount of the non-aqueous solution 304 containing the photo-initiator(s) into a container 312. The resulting mixture 310 represents a non-aqueous solution containing the lanthanide compound(s) and the photo-initiator(s). As a particular example, approximately 50 ml of a non-aqueous solution 304 containing benzophenone can be mixed with approximately 25 ml of a non-aqueous solution 302 containing erbium chloride and placed in a container, such as a Petri dish. Note that while this mixture has a ratio of about two parts solution 304 to one part solution 302, other ratios could also be used. Also note that each solution can be nitrogen bubbled, such as for about two minutes, to remove dissolved oxygen.

The resulting mixture 310 is exposed to ultraviolet (UV) illumination at step 210. This could include, for example, using a mercury lamp or other suitable UV source 314 to generate the UV illumination. The mixture 310 can be exposed to the UV illumination for any suitable time period, such as between about two to about ten minutes (although any other suitable length of time could be used).

The mixture 310 is dried to form a residue containing lanthanide nanoparticles in an inert atmosphere at step 212. This could include, for example, exposing the mixture 310 to an active gas flow 316. The drying could last for any suitable length of time, such as about 12 hours or more. The drying could also occur at any suitable temperature(s), such as at room temperature. Once dried, a residue 318 on the walls and floor of the container 312 contains lanthanide nanoparticles. The nanoparticles can have varying sizes, such as sizes between about 1 nm to several hundred nanometers. The exact sizes and composition of the nanoparticles can be determined in any suitable manner, such as by using scanning electron microscopy (SEM) or energy dispersive X-ray (EDX) spectroscopy.

Although FIGS. 2 and 3 illustrate one example of a method 200 for forming lanthanide nanoparticles and related details, various changes may be made to FIGS. 2 and 3. For example, while shown as a series of steps or operations, various steps or operations could overlap, occur in parallel, or occur in a different order.

The lanthanide nanoparticles described above could be used in any suitable manner and for any suitable purpose. For example, the lanthanide nanoparticles could be formulated into an ink, which can then be deposited onto a flexible or other substrate to form electronic circuit components. The lanthanide nanoparticles could also be used to form a larger structure during an additive manufacturing technique. "Additive manufacturing" generally refers to a manufacturing technique in which material is added onto other material to form a larger structure. This is opposed to "subtractive manufacturing" in which material is removed from a larger structure to form a smaller structure, such as by using cutting, grinding, or other milling operations. As a particular example, the lanthanide nanoparticles could be formulated into an ink that is used as part of an additive manufacturing process to form a heat exchanger for a cryocooler. For simplicity, the phrase "heat exchanger" includes cryocooler regenerators, recuperative heat exchangers, and other structures that exchange heat with a fluid flowing in a cryocooler. Details of this example use are provided below.

Figure 4:
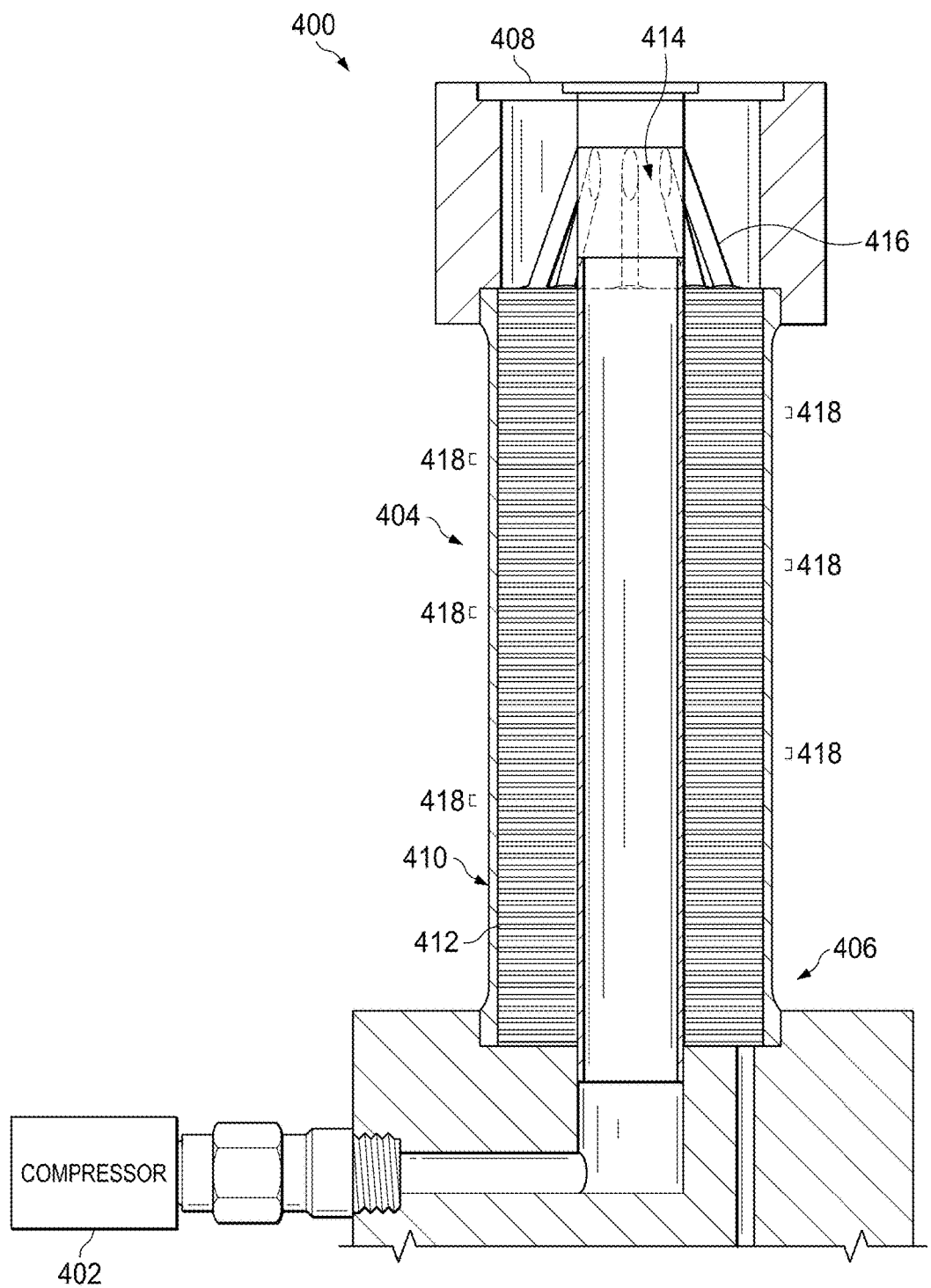
FIG. 4 illustrates a first example cryocooler having a heat exchanger that contains one or more portions created using lanthanide nanoparticles in accordance with this disclosure.

FIG. 4 illustrates a first example cryocooler 400 having a heat exchanger that contains one or more portions created using lanthanide nanoparticles in accordance with this disclosure. More specifically, FIG. 4 illustrates a pulse tube cryocooler having a regenerator, where portions of the regenerator are created using lanthanide nanoparticles.

As shown in FIG. 4, the cryocooler 400 includes a compressor 402 and an expander assembly 404. The compressor 402 creates a flow of fluid within the expander assembly 404. For example, the compressor 402 could include a piston that strokes back and forth during each compression cycle, where multiple compression cycles occur at a specified drive frequency. The piston can therefore push the fluid into the expander assembly 404 and draw the fluid out of the expander assembly 404 during operation of the compressor 402. The compressor 402 includes any suitable structure for moving at least one gas or other fluid(s) in a cooling system.

Fluid is pushed into and pulled out of the expander assembly 404 by the compressor 402. This back and forth motion of the fluid, along with controlled expansion and contraction of the fluid, creates cooling in the expander assembly 404. In this example, the expander assembly 404 has a warm end 406 and a cold end 408. As the names imply, the warm end 406 of the expander assembly 404 is at a higher temperature than the cold end 408 of the expander assembly 404. The cold end 408 of the expander assembly 404 could reach any suitably low temperature, such as down to about 4 Kelvin (about −452.5° F.) or even lower depending on the design. The cold end 408 of the expander assembly 404 can therefore, for example, be thermally coupled to a device or system to be cooled.

The expander assembly 404 includes a pulse tube 410 and a regenerator 412. The pulse tube 410 represents a passageway through which the fluid can move or pulse back and forth. The regenerator 412 represents a structure that contacts the fluid and exchanges heat with the fluid. For example, when the fluid passes from the warm end 406 to the cold end 408 of the expander assembly 404, heat from the fluid can be absorbed by the regenerator 412. When the fluid passes from the cold end 408 to the warm end 406 of the expander assembly 404, heat from the regenerator 412 can be absorbed by the fluid.

The pulse tube 410 includes any suitable structure for holding a fluid that pulses or otherwise moves back and forth during multiple cycles. The pulse tube 410 could be formed from any suitable material(s) and have any suitable size, shape, and dimensions. The pulse tube 410 could also be fabricated in any suitable manner.

The cold end 408 of the expander assembly 404 includes a heat exchanger 414 and coupling channels 416. The heat exchanger 414 generally operates to remove heat at the cold end 408 of the expander assembly 404. The coupling channels 416 fluidly couple the heat exchanger 414 and the regenerator 412.

As described in more detail below, the regenerator 412 includes multiple portions 418 that are fabricated using lanthanide nanoparticles. For example, in some embodiments, each portion 418 can include (i) a substrate formed from at least one allotropic form of carbon and (ii) nanoparticles on or over the substrate. However, other substrates and/or materials on or over the substrates could also be used.

Figure 5B:
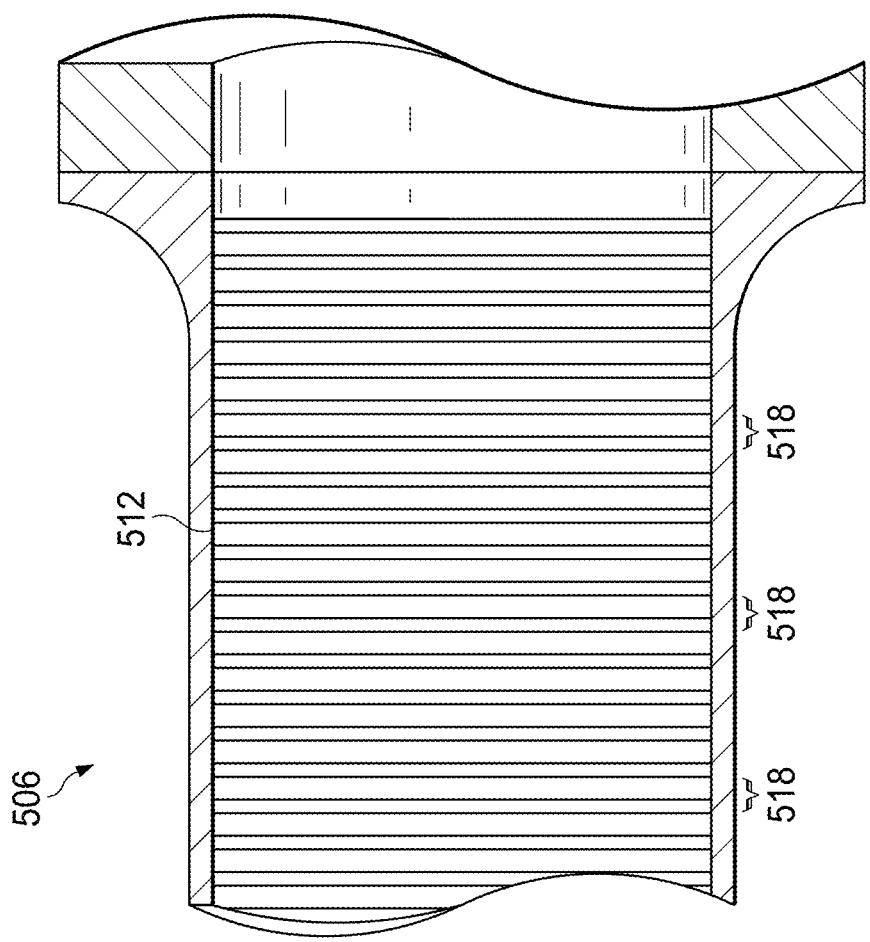

FIGS. 5A and 5B illustrate a second example cryocooler 500 having a heat exchanger that contains one or more portions created using lanthanide nanoparticles in accordance with this disclosure. More specifically, FIGS. 5A and 5B illustrates a two-stage Stirling cryocooler having a regenerator, where portions of the regenerator are created using lanthanide nanoparticles.

As shown in FIGS. 5A and 5B, a compressor 502 is fluidly coupled to an expander assembly 504 and causes fluid to move back and forth within the expander assembly 504. Any suitable compressor 502 could be used in the cryocooler 500. The expander assembly 504 represents part of a first stage 506 of the two-stage Stirling cooling system. A second stage 508 of the Stirling cooling system includes a pulse tube.

Part of the first stage 506 is shown in greater detail in FIG. 5B. As shown in FIG. 5B, the first stage 506 includes a regenerator 512 through which the fluid traveling within the first and second stages 506-508 passes. Once again, the regenerator 512 represents a structure that contacts the fluid and exchanges heat with the fluid. For example, when the fluid passes right to left through the regenerator 512 in FIG. 5B, heat from the fluid can be absorbed by the regenerator 512. When the fluid passes left to right through the regenerator 512 in FIG. 5B, heat from the regenerator 512 can be absorbed by the fluid.

As described in more detail below, the regenerator 512 includes multiple portions 518 that are fabricated using lanthanide nanoparticles. For example, in some embodiments, each portion 518 can include (i) a substrate formed from at least one allotropic form of carbon and (ii) nanoparticles on or over the substrate. However, other substrates and/or materials on or over the substrates could also be used.

Although FIGS. 4 through 5B illustrate examples of cryocoolers 400, 500 having heat exchangers that contain one or more portions created using lanthanide nanoparticles, various changes may be made to FIGS. 4 through 5B. For example, each regenerator 412, 512 or other heat exchanger could include any number of portions 418, 518. Also, while the portions 418, 518 are shown here as being physically separated, this is for ease of illustration only. The various portions 418, 518 of a cryocooler heat exchanger could have any suitable spacing(s) or physically contact one another. In addition, FIGS. 4 through 5B represent examples of cryocoolers that include heat exchangers containing one or more portions created using lanthanide nanoparticles. Such heat exchangers could be used in other types of cryocoolers, such as in a single-stage Stirling cryocooler or a Gifford-McMahon cryocooler. Moreover, the same or similar structure could be used in a recuperative heat exchanger, such as for a reverse turbo-Brayton cryocooler or a Joule-Thomson cryocooler. In general, any single-stage or multi-stage cryocooler could include a regenerator, recuperative heat exchanger, or other heat exchanger having at least one portion created using additive manufacturing.

Figure 6:
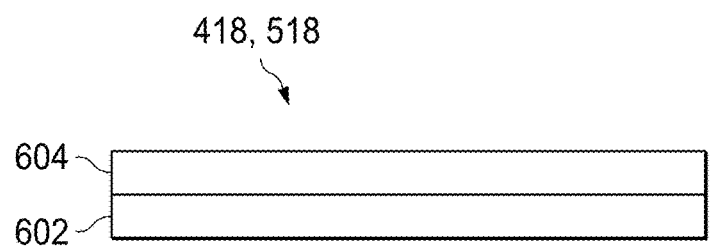
FIG. 6 illustrates an example portion of a cryocooler heat exchanger created using lanthanide nanoparticles in accordance with this disclosure.

FIG. 6 illustrates an example portion 418, 518 of a cryocooler heat exchanger created using lanthanide nanoparticles in accordance with this disclosure. As shown in FIG. 6, the portion 418, 518 of the cryocooler heat exchanger includes a substrate 602 and a nanoparticle layer 604. In some embodiments, the substrate 602 generally denotes a structure that includes at least one allotropic form of carbon. Also, in some embodiments, the nanoparticle layer 604 generally denotes a layer in which nanoparticles have been deposited (possibly in a pattern) on or over the substrate.

In particular embodiments, the substrate 602 is formed from any suitable allotropic form(s) of carbon, such as carbon nanotubes or graphene nanoplatelets. The substrate 602 can also be formed in any suitable manner, such as by manufacturing or purchasing a sheet of carbon nanotubes or graphene nanoplatelets. The nanoparticle layer 604 includes nanoparticles formed from any suitable material(s), such as nanoparticles formed from erbium (Er), praseodymium (Pr), holmium (Ho), gadolinium (Gd), or other lanthanide element(s) or alloy(s). Note, however, that the nanoparticles could be formed from any suitable material(s) having a very high volumetric specific heat at very low temperatures. Other example materials could include lead (Pb), nickel (Ni), or other element(s) or alloy(s). The nanoparticles can also be deposited in any suitable manner. Example techniques include printing an ink containing suspended nanoparticles onto a substrate using an inkjet printer.

As described in more detail below, the porosity of the substrate 602 and the patterns formed using the nanoparticles in the nanoparticle layer 604 can be controlled or modified in order to achieve desired heat transfer characteristics, fluid flow characteristics, or other characteristics in a heat exchanger. For example, after the nanoparticles are deposited on a substrate, the structure could undergo one or more post-production processing operations to create pores of one or more desired sizes in the structure. This could be accomplished in any suitable manner, such as by using one or more lasers. In some embodiments, the porosity can be controlled so as to be high enough to not substantially impede the flow of fluid in the heat exchanger, and a reduced pressure drop within the heat exchanger compared to conventional structures could be obtained.

Combining the use of substrates formed from carbon allotropes with the use of lanthanide nanoparticles can provide various advantages depending on the implementation. For example, any heat flow within a heat exchanger between the warm and cold ends of a cryocooler reduces the overall cooling capacity and effectiveness of the cryocooler. However, substrates formed from carbon allotropes like carbon nanotubes or graphene easily allow heat to travel radially or laterally (right/left in FIG. 4 or up/down in FIG. 5B) while substantially blocking heat from traveling axially (up/down in FIG. 4 or right/left in FIG. 5B). In this document, the term "axial" refers to a direction substantially parallel to an axis of a heat exchanger along a longer dimension of the heat exchanger. The terms "radial" and "lateral" refer to a direction substantially perpendicular to the axial direction. By supporting heat transfer in this manner, axial heat flows within the heat exchanger can be substantially reduced while radial/lateral heat transfers into and out of the nanoparticle layer 604 can be improved, reducing end-to-end thermal conduction losses in the heat exchanger and helping to increase the overall cooling capacity and effectiveness of the cryocooler.

As another example, the deposition of lanthanide nanoparticles can be precisely controlled to achieve feature sizes much smaller than using conventional cryocooler manufacturing techniques. For example, printing ink containing the nanoparticles onto a substrate could be done with feature sizes as small as about five to ten microns (or even smaller). This facilitates the design of a heat exchanger with much lower pressure losses while still accomplishing the desired heat transfer. This can also allow significantly higher-frequency operation relative to conventional low-temperature cryocoolers. This is because smaller feature sizes facilitate more rapid heat exchanges over smaller distances between the substrate 602/nanoparticle layer 604 and the fluid in the cryocooler.

These and other characteristics enable the cryocoolers 400, 500 to operate at higher frequencies in smaller packages. For example, many conventional cryocoolers that attempt to reach temperatures of 4 Kelvin often operate at frequencies between 1 Hertz (Hz) and 20 Hz. The approach described in this patent document can be used at higher frequencies, such as between about 30 Hz to about 60 Hz. Since the size/mass of a cryocooler typically scales inversely to its frequency, this helps to reduce the size/mass of the cryocoolers 400, 500. Moreover, these and other characteristics enable the cryocoolers 400, 500 to achieve efficiency gains from the more effective use of solid materials. In addition, these and other characteristics enable the cryocoolers 400, 500 to reduce pressure drops and reduce conduction losses in the cryocoolers 400, 500. Overall, this allows the cryocoolers 400, 500 to more efficiently and effectively achieve lower cryogenic temperatures, such as temperatures below 20 Kelvin (including about 10 Kelvin or about 4 Kelvin).

Although FIG. 6 illustrates one example of a portion 418, 518 of a cryocooler heat exchanger created using lanthanide nanoparticles, various changes may be made to FIG. 6. For example, additional layers of material(s) could be used in any suitable location(s). Also, this disclosure is not limited to use with just carbon allotropes and nanoparticles in a heat exchanger. Various other structures and techniques (such as chemical vapor deposition) can be used to additively manufacture a heat exchanger for a cryocooler.

Figure 7:
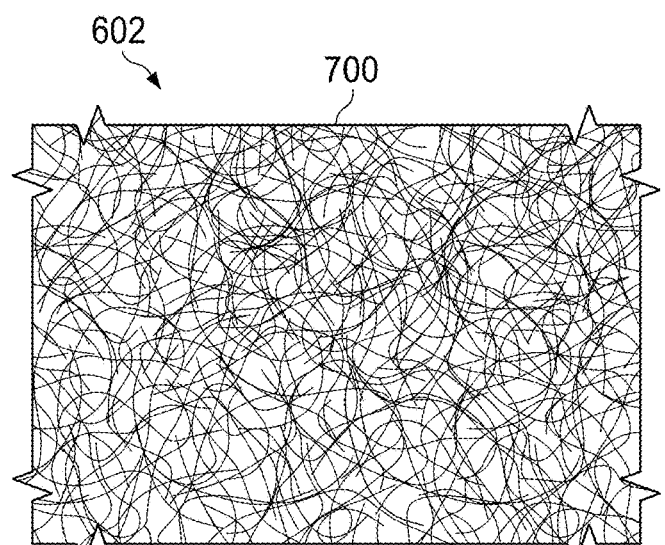
FIGS. 7 and 8 illustrate example substrates for a cryocooler heat exchanger in accordance with this disclosure.
Figure 8:
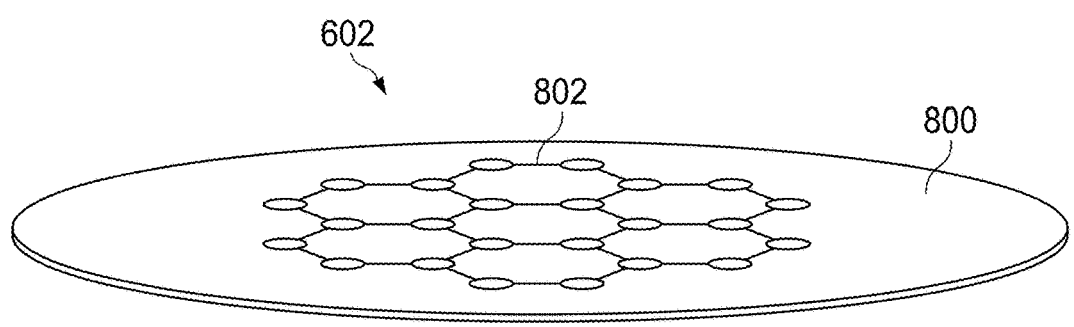

FIGS. 7 and 8 illustrate example substrates for a cryocooler heat exchanger in accordance with this disclosure. More specifically, FIGS. 7 and 8 illustrate example substrates 602 that could be used in different portions 418, 518 in the regenerators 412, 512 of FIGS. 4 through 5B or in any other suitable cryocooler heat exchanger.

FIG. 7 shows a close-up view of a portion of a sheet 700 of carbon nanotubes 702. As can be seen in FIG. 7, the carbon nanotubes 702 are generally planar and travel substantially laterally within the sheet 700. The carbon nanotubes 702 here travel random paths within the sheet 700, although more regular paths could be imparted in a sheet 700.

This arrangement of carbon nanotubes 702 allows fluid to flow through the sheet 700 and contact the carbon nanotubes 702 and the nanoparticles in the adjacent nanoparticle layer(s) 604. Heat transfer can occur between the fluid and the carbon nanotubes 702. Heat transfer can also occur between the carbon nanotubes 702 and the nanoparticles in the adjacent nanoparticle layer(s) 604 (where heat transfer is occurring between the fluid and the nanoparticles). The porosity of the sheet 700 can be controlled based on, for example, the quantity and size(s) of the carbon nanotubes 702 within the sheet 700, as well as any post-production processing operations (such as laser etching through the sheet 700). Also, the overall size and shape of the sheet 700 can be based on various factors, such as the desired volumetric heat capacity and shape of the heat exchanger.

Heat transport within the sheet 700 generally occurs along the carbon nanotubes 702. As can be seen in FIG. 7, the carbon nanotubes 702 generally travel laterally (side to side) within the sheet 700. As a result, a significant portion of the heat transported through the carbon nanotubes 702 is transported laterally within the sheet 700. To the small extent the carbon nanotubes 702 travel axially (top to bottom) within the sheet 700, this results in a significantly smaller amount of heat transport axially within the sheet 700. Note that it is also possible to dope or co-deposit the carbon nanotubes 702 with one or more other materials to adjust the volumetric thermal capacity of the heat exchanger.

In FIG. 8, a sheet 800 of graphene (sometimes referred to as "graphene paper") is used. As can be seen in FIG. 8, the sheet 800 represents a thin structure formed using a condensed hexagonal matrix 802 of carbon atoms. Pores can be formed through the sheet 800 of graphene in any suitable manner, such as via laser etching. This allows fluid to flow through the sheet 800 and contact the graphene. Heat transfer can occur between the fluid and the graphene, and heat transfer can also occur between the nanoparticles in the adjacent nanoparticle layer(s) 604 and the graphene (where heat transfer is occurring between the fluid and the nanoparticles). Note that while shown as being in the shape of a disc, the overall size and shape of the sheet 800 can be based on various factors, such as the desired volumetric heat capacity and shape of the heat exchanger.

Once again, heat transport within the sheet 800 generally occurs laterally within the sheet 800, mainly along the matrix 802 of carbon atoms. Since the matrix 802 is arranged laterally (side to side) within the sheet 800, a significant portion of the heat transported through the matrix 802 is transported laterally within the sheet 800. To the small extent the matrix 802 travels axially (top to bottom) within the sheet 800, this results in a significantly smaller amount of heat transport axially within the sheet 800.

Although FIGS. 7 and 8 illustrate examples of substrates for a cryocooler heat exchanger, various changes may be made to FIGS. 7 and 8. For example, each portion 418, 518 could have any suitable form factor, such as a rectangular sheet, circular disc, toroidal disc, or other regular or irregular shape. Also, as noted above, this disclosure is not limited to use with substrates containing carbon allotropes.

Figure 9:
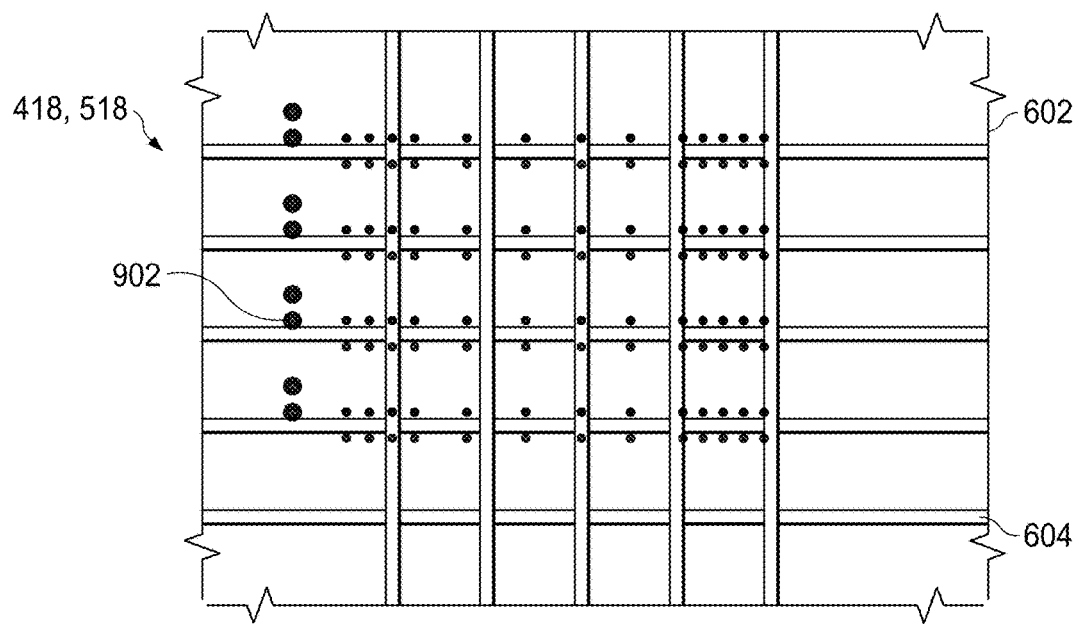
FIG. 9 illustrates a specific example of a portion of a cryocooler heat exchanger created using lanthanide nanoparticles in accordance with this disclosure.

FIG. 9 illustrates a specific example of a portion 418, 518 of a cryocooler heat exchanger created using lanthanide nanoparticles in accordance with this disclosure. In this example, the nanoparticle layer 604 has been printed in a grid pattern with horizontal and vertical lines of lanthanide nanoparticles. Note, however, that other or additional patterns of nanoparticles could be used.

Also as shown in FIG. 9, pores 902 have been formed in the structure. The pores 902 denote passages for fluid to flow through the portion 418, 518 of the cryocooler heat exchanger. The pores 902 can be formed in any suitable manner, such as by laser etching. Any suitable number of pores could be formed in any suitable pattern.

In some embodiments, the printing of lanthanide nanoparticles and the use of laser etching can allow for precise control over parameters such as porosity, hydraulic and solid feature sizes, feature spacing, and patterns. In particular embodiments, feature sizes of about five to ten microns for both the printed nanoparticle material (grid lines forming the layer 604) and flow passages (pores 902) can be used.

Although FIG. 9 illustrates one specific example of a portion 418, 518 of a cryocooler heat exchanger created using lanthanide nanoparticles, various changes may be made to FIG. 9. For example, other or additional regular or irregular arrangements of nanoparticles and pores could be used. Also, the use of pores 902 is not limited to the specific implementation of the substrate 602 and nanoparticle layer 604 shown in FIG. 9. In addition, as noted above, this disclosure is not limited to use with nanoparticles.

Figure 10:
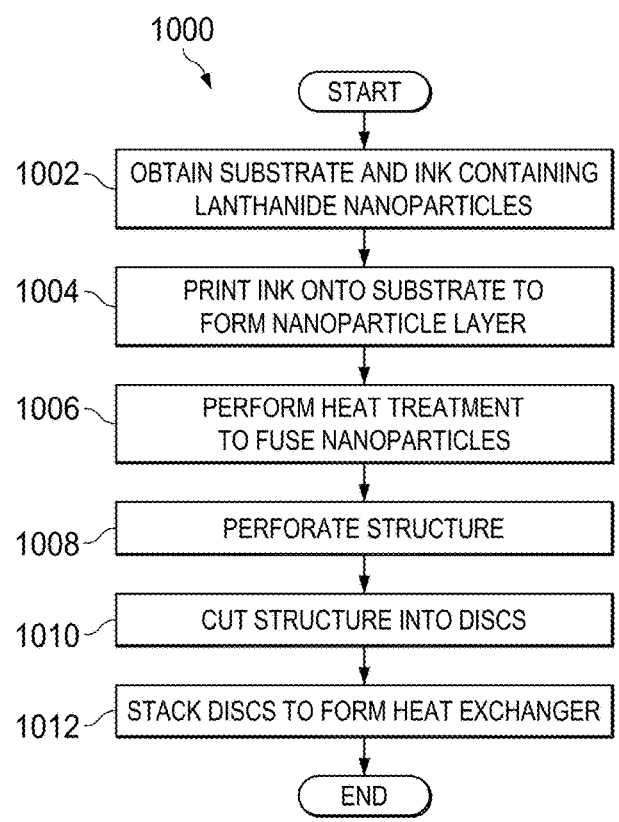
FIGS. 10 and 11 illustrate example methods for forming a cryocooler heat exchanger using lanthanide nanoparticles in accordance with this disclosure.
Figure 11:
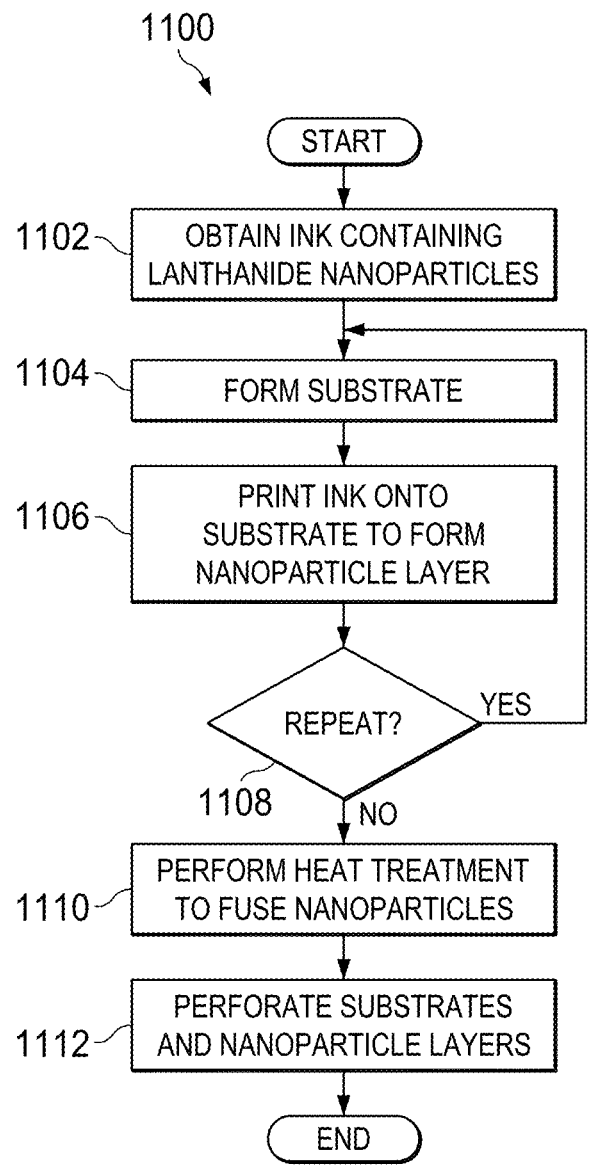

FIGS. 10 and 11 illustrate example methods 1000, 1100 for forming a cryocooler heat exchanger using lanthanide nanoparticles in accordance with this disclosure. As shown in FIG. 10, a substrate and an ink containing lanthanide nanoparticles are obtained at step 1002. This could include, for example, manufacturing, purchasing, or otherwise obtaining a sheet of carbon nanotubes or graphene. This could also include manufacturing, purchasing, or otherwise obtaining an ink containing lanthanide element, lanthanide alloy, or other nanoparticles. As a particular example, the technique described above with respect to FIGS. 2 and 3 could be used to manufacture lanthanide nanoparticles. Also, as a particular example, the techniques presented in U.S. Pat. No. 7,789,935 (which is hereby incorporated by reference in its entirety) could be used to formulate an ink containing lanthanide nanoparticles. However, any other technique now known or developed in the future could be used to formulate inks containing lanthanide nanoparticles.

The ink is printed onto the substrate to form a nanoparticle layer at step 1004. This could include, for example, using an inkjet printer to print the ink onto the substrate. Any suitable inkjet printer could be used, such as an OPTOMEC AEROJET printer. Also, the ink could be deposited in any suitable manner, such as in a grid pattern or other pattern.

A heat treatment is performed to fuse the nanoparticles in the nanoparticle layer at step 1006. This could include, for example, performing a heat treatment at about 150° C. (about 302° F.) while under a reducing atmosphere (such as one containing hydrogen). The heat treatment fuses the nanoparticles in order to help ensure continuity in the grid pattern or other pattern(s) formed using the nanoparticles.

The structure is perforated at step 1008. This could include, for example, forming pores through the substrate using a laser. The structure is cut into discs at step 1010, and the discs are stacked to form a heat exchanger at step 1012. This could include, for example, using a laser to cut the structure into discs. This could also include using a suitable bonding agent or other mechanism to stack the discs. Note that the use of discs is for illustration only and that the heat exchanger could have sections of any other desired cross-sectional shape. The resulting structure can represent a completed heat exchanger, or other processing steps could be performed to complete fabrication of a completed heat exchanger.

As shown in FIG. 11, an ink containing lanthanide nanoparticles is obtained at step 1102. This could include, for example, manufacturing, purchasing, or otherwise obtaining an ink containing lanthanide element, lanthanide alloy, or other nanoparticles. As a particular example, the technique described above with respect to FIGS. 2 and 3 could be used to manufacture lanthanide nanoparticles. Also, as a particular example, the techniques presented in U.S. Pat. No. 7,789,935 could be used to formulate an ink containing lanthanide nanoparticles. However, any other technique now known or developed in the future could be used to formulate inks containing lanthanide nanoparticles.

A substrate is formed at step 1104. This could include, for example, using an inkjet printer to print carbon nanotubes or graphene into the shape of a desired substrate. Note, however, that any other suitable technique could be used to create a substrate containing, for example, an allotropic form of carbon. The ink is printed onto the substrate to form a nanoparticle layer at step 1106. This could include, for example, using the inkjet printer to print the ink onto the substrate in a grid pattern or other pattern(s).

A decision is made whether to form any additional substrate and nanoparticle layers at step 1108. This could include, for example, determining whether a desired number of substrate and nanoparticle layers have been fabricated. If additional substrate and nanoparticle layers are needed, the process returns to step 1104 where another substrate can be formed on or over the previously-fabricated nanoparticle layer.

Otherwise, a heat treatment is performed to fuse the nanoparticles in the nanoparticle layers at step 1110, and the structure is perforated at step 1112. This could include, for example, performing a photo-sintering process or other heat treatment at about 150° C. (about 302° F.) or other temperature. This could also include forming pores through the substrates using a laser. The resulting structure can represent a completed heat exchanger, or other processing steps could be performed to complete fabrication of a completed heat exchanger.

Although FIGS. 10 and 11 illustrate examples of methods 1000, 1100 for forming a cryocooler heat exchanger using lanthanide nanoparticles, various changes may be made to FIGS. 10 and 11. For example, while each figure shows a series of steps, various steps in each figure could overlap, occur in parallel, occur in a different order, or occur multiple times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    forming a non-aqueous solution by mixing in a container (i) approximately one part of a first non-aqueous solution comprising one or more metallic salts, the one or more metallic salts comprising erbium chloride, each metallic salt comprising at least one lanthanide element, and (ii) approximately two parts of a second non-aqueous solution comprising one or more photo-initiators;
    degassing the non-aqueous solution using dry nitrogen gas to remove dissolved oxygen from the non-aqueous solution;
    exposing the non-aqueous solution to ultraviolet illumination;
    producing lanthanide nanoparticles using the non-aqueous solution; and
    forming a residue containing the lanthanide nanoparticles on at least one wall of the container by drying the non-aqueous solution using an active gas flow.

2. The method of claim 1, wherein the one or more photo-initiators comprise benzophenone.

3. The method of claim 1, wherein each non-aqueous solution comprises an organic solvent.

4. The method of claim 3, wherein the organic solvent comprises an alcohol.

5. A method comprising:
    forming a first non-aqueous solution comprising one or more metallic salts, the one or more metallic salts comprising erbium chloride, each metallic salt comprising at least one lanthanide element;
    forming a second non-aqueous solution comprising one or more photo-initiators;
    degassing the first non-aqueous solution and the second non-aqueous solution using dry nitrogen gas to remove dissolved oxygen from the first and second non-aqueous solutions;
    forming a mixture of the first non-aqueous solution and the second non-aqueous solution by combining the first non-aqueous solution and the second non-aqueous solution in a container at a ratio of approximately 1:2;
    exposing the mixture to ultraviolet illumination;
    producing lanthanide nanoparticles using the mixture; and
    forming a residue containing the lanthanide nanoparticles on at least one wall of the container by drying the mixture using an active gas flow.

6. The method of claim 5, wherein the one or more photo-initiators comprise benzophenone.

7. The method of claim 5, wherein each non-aqueous solution comprises an organic solvent.

8. The method of claim 7, wherein the organic solvent comprises an alcohol.

9. The method of claim 5, further comprising:
    degassing the mixture to remove one or more dissolved gases from the mixture.

10. The method of claim 9, further comprising:
    after depositing a layer of the lanthanide nanoparticles on a substrate, performing a sintering operation in a reducing atmosphere to obtain a continuous metallic trace.

11. The method of claim 5, wherein the first non-aqueous solution comprises approximately $10^{-3}$M high purity anhydrous erbium chloride in HPLC-grade isopropyl alcohol.

12. The method of claim 5, wherein the second non-aqueous solution comprises approximately $10^{-3}$M benzophenone in HPLC-grade isopropyl alcohol.

13. The method of claim 5, further comprising:
    formulating an ink containing the lanthanide nanoparticles.

14. The method of claim 13, further comprising:
    using the ink containing the lanthanide nanoparticles in an additive manufacturing process to form portions of a heat exchanger.

15. A method comprising:
    forming a first non-aqueous solution comprising an organic solvent and one or more metallic salts, the one or more metallic salts comprising erbium chloride, each metallic salt comprising at least one lanthanide element;
    forming a second non-aqueous solution comprising an organic solvent and benzophenone;
    degassing the first non-aqueous solution and the second non-aqueous solution using dry nitrogen gas to remove dissolved oxygen from the first and second non-aqueous solutions;
    forming a mixture of the first non-aqueous solution and the second non-aqueous solution by combining the first non-aqueous solution and the second non-aqueous solution in a container at a ratio of approximately 1:2;
    exposing the mixture to ultraviolet illumination;
    producing lanthanide nanoparticles using the mixture; and
    forming a residue containing the lanthanide nanoparticles on at least one wall of the container by drying the mixture using an active gas flow.

16. The method of claim 15, wherein the organic solvent comprises an alcohol.

17. The method of claim 1, wherein the first non-aqueous solution comprises approximately $10^{-3}$M high purity anhydrous erbium chloride in High Performance Liquid Chromatography (HPLC)-grade isopropyl alcohol.

18. The method of claim 1, wherein the second non-aqueous solution comprises approximately $10^{-3}$M benzophenone in HPLC-grade isopropyl alcohol.

19. The method of claim 1, further comprising:
    formulating an ink containing the lanthanide nanoparticles.

20. The method of claim 19, further comprising:
    using the ink containing the lanthanide nanoparticles in an additive manufacturing process to form portions of a heat exchanger.

21. The method of claim 15, further comprising:
    formulating an ink containing the lanthanide nanoparticles.

* * * * *